Jan. 5, 1965   C. S. GRIS   3,164,334
SPINNING REEL LINE RETAINER
Filed Jan. 3, 1962   2 Sheets-Sheet 2
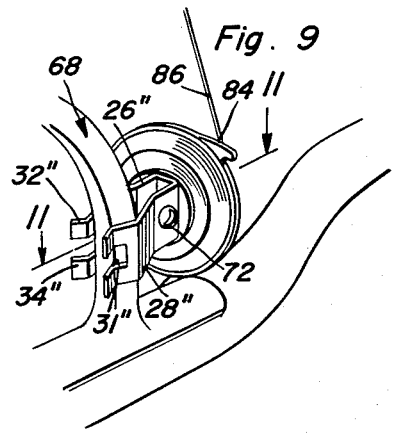
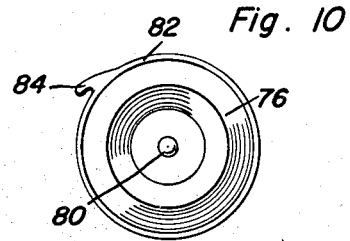
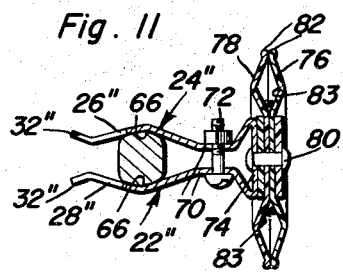
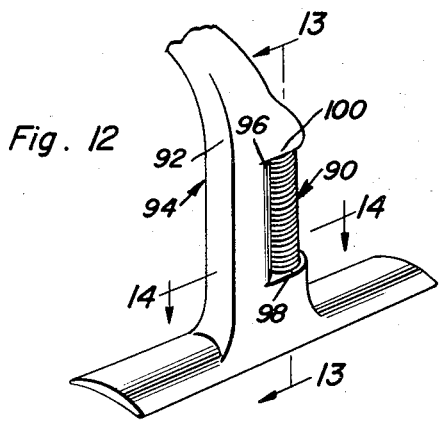
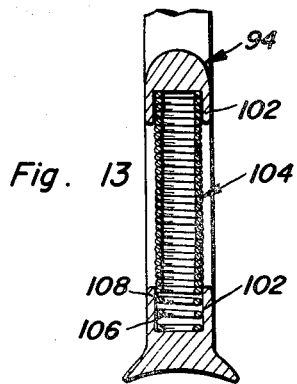
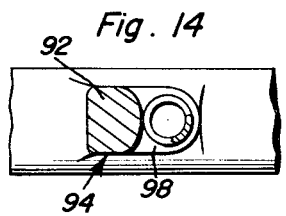
Celester Silvio Gris
INVENTOR.

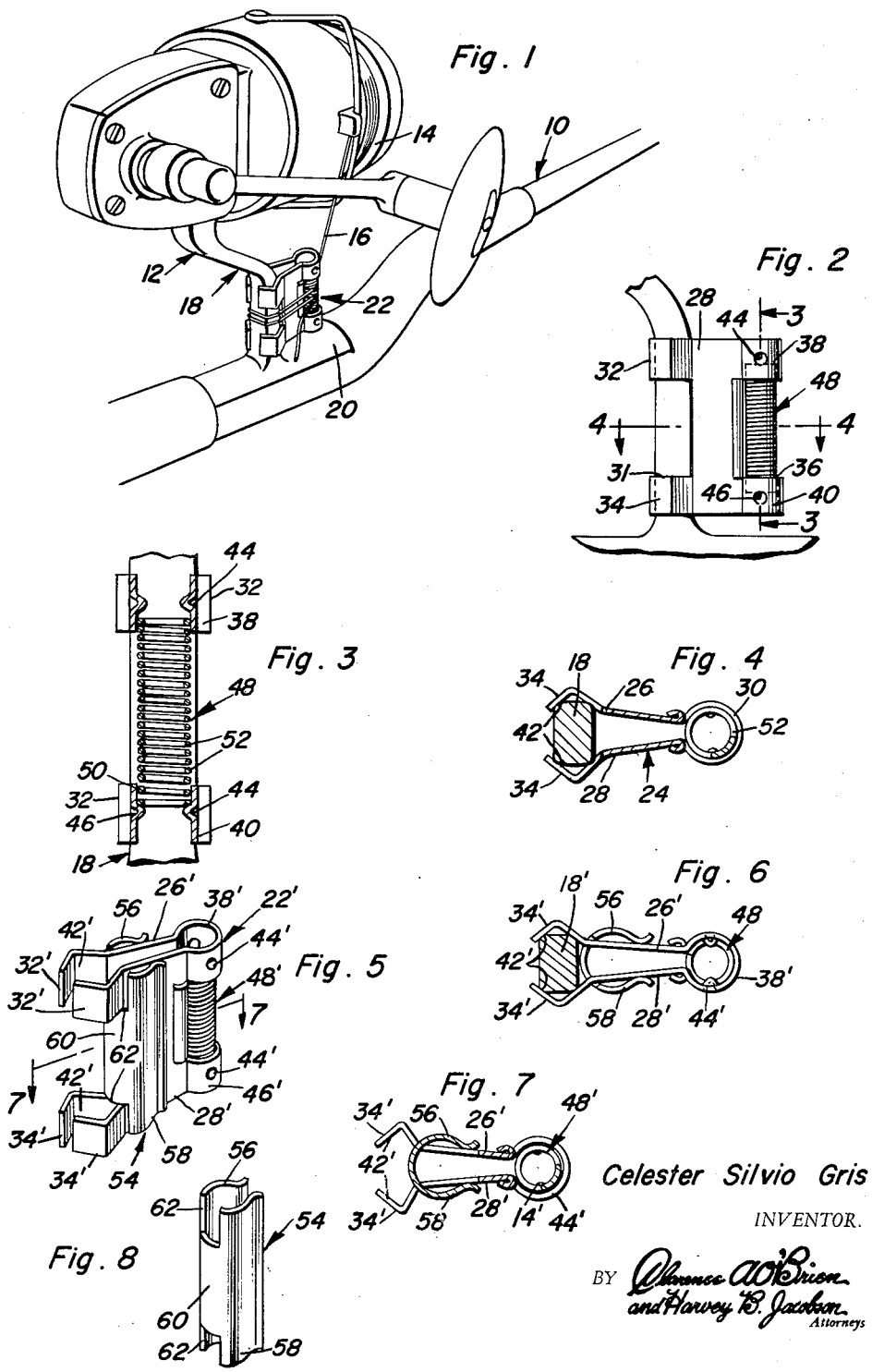

United States Patent Office 3,164,334
Patented Jan. 5, 1965

3,164,334
SPINNING REEL LINE RETAINER
Celester Silvio Gris, 436 Fortier St., Kimberley,
British Columbia, Canada
Filed Jan. 3, 1962, Ser. No. 164,005
4 Claims. (Cl. 242—84.1)

This invention relates to a novel and useful spinning reel line retainer means and more specifically to a adaptation which is primarily designed for support by a spinning reel shank and to serve the purpose of releasably and clampingly engaging the free end of the fishing line carried by the spinning reel in order that the fishing line will not become entangled when the spinning reel is not in use.

Quite often serious fishermen will carry tackle boxes with them when engaged in the sport of angling and among various other types of extra equipment carried in a tackle box is one or more spare reels. The fisherman oftentimes has use for a particular one of several different types of reels as well as a particular one of several different types of fishing lines. Accordingly, the serious angler usually carries several reels with different weight and type of fishing line wound thereabout. As the fisherman feels a different type of reel or line should be used, he changes to the desired type of reel or line and thus a tackle box can become seriously entangled with various different types of fishing line wound about several different reels unless a means is provided for retaining the loose end of the fishing line in such a manner that it will not be able to unwind from the reel. In addition to providing means for retaining the loose end of a fishing line wound about a reel from unwinding from the reel, the means provided should be of a type which may be utilized quickly and with very little effort.

It is accordingly the main object of this invention to provide a spinning reel line retainer which may be readily secured to various types of spinning reels as well as other types of spinning reels and which may also be readily incorporated into a spinning reel during the manufacture of the latter and efficiently utilized by a fisherman for retaining the loose end of a fishing line and preventing the fishing line from unwinding from about the spool on which it is disposed.

A further object of this invention, in accordance with the immediately preceding object, is to provide a fishing line retainer which may be secured to a reel as an attachment therefor or incorporated thereinto in such a manner so as not to interfere with the ordinary operation of the reel.

Still another object of this invention is to provide a fishing line retainer in the form of an attachment for a reel which is constructed in a manner whereby it may be readily secured to various types of spinning reels.

A final object to be specifically enumerated herein is to provide a spinning reel line retainer in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a fishing rod shown with a conventional form of spinning reel mounted thereon and the line retainer of the instant invention mounted on the shank of the spinning reel and being utilized to secure the loose end of the fishing line wound about the spinning reel in a manner whereby it will not become unwound from the reel;

FIGURE 2 is a side elevational view of the line retainer on somewhat of an enlarged scale;

FIGURE 3 is an enlarged fragmentary sectional view taken substantially upon the plane indicated by the section line 3—3 of FIGURE 2;

FIGURE 4 is an enlarged sectional view taken substantially upon the plane indicated by the section line 4—4 of FIGURE 2;

FIGURE 5 is a perspective view of a modified form of line retainer which may be constructed of mild steel or other similar materials not known for their resilient properties and incorporating the use of a separate resilient clip for maintaining the line retainer mounted on the shank of a spinning reel;

FIGURE 6 is a top plan view of the embodiment illustrated in FIGURE 5;

FIGURE 7 is a sectional view taken substantially upon the plane indicated by the section line 7—7 of FIGURE 5;

FIGURE 8 is a perspective view of the resilient clip utilized on the modified form of line retainer;

FIGURE 9 is a fragmentary perspective view of a fishing rod having a spinning reel mounted thereon with a further modified form of the line retainer mounted thereon;

FIGURE 10 is a front elevational view of the line retainer illustrated in FIGURE 9;

FIGURE 11 is a horizontal sectional view taken substantially upon the plane indicated by the section line 11—11 of FIGURE 9;

FIGURE 12 is a fragmentary perspective view of the mounting shank of a spinning reel showing a further modified form of line retainer which has been incorporated into the manufacture of the spinning reel;

FIGURE 13 is an enlarged fragmentary sectional view taken substantially upon the plane indicated by the section line 13—13 of FIGURE 12; and FIGURE 14 is an enlarged horizontal sectional view taken substantially upon the plane of the section line 14—14 of FIGURE 12.

As will be evident from the views of the drawing, four species or embodiments are disclosed, namely, FIGS. 1–4, FIGS. 5–8, FIGS. 9–11 and FIGS. 12–14. The preferred embodiment of the overall concept is that utilizing a coil spring as an anchor or retainer for the terminal of the line as depicted in FIGS. 1–4, FIGS. 5–8 and FIGS. 12–14. Generically construed the foregoing preferred concept is characterized, by a spinning reel having a spool, more particularly a reel construction which is provided with a shank having bracket means which is attachable, in a generally well known manner to a fishing rod and the combination with the shank of a suitable coil spring, said spring being parallel to said shank, and means cooperatively associated with and projecting laterally from the shank and embodying a pair of axially aligned socket members with the socket portions opposed to or facing each other, and said coil spring spanning the space between the socket members and having its ends fitting telescopically into the socket portions of said socket members.

Referring specifically to the drawings (FIGS. 1 to 4) the numeral 10 generally designates a fishing rod to which a spinning reel generally referred to by the reference numeral 12 is secured. The spinning reel 12 includes a drum portion 14 about which one end of a length of fishing line 16 is wound and the reel 12 includes a shank portion generally referred to by the reference numeral 18 which supports a mounting base 20 at one end. The line retainer of the instant invention is generally designated by the reference numeral 22 and with attention now directed to FIGURES 2 through 4 of the drawings it will be noted that the retainer 22 includes a generally U-shaped member referred to in general by the reference numeral 24 and including a pair of legs 26 and 28 which are interconnected by means of a bight portion 30. It will be noted that the bight portion 30 is generally approximately three-quarter cylindrical in cross-section and that the legs 26 and 28 are panel-like and each has formed therein at their outer extremities a notch 31 which divides the outer end of each leg into two spaced end portions 32 and 34. In addition, the U-shaped member includes a notch 36 which opens away from the notch 31 and divides the bight portion 30 into two axially spaced and aligned recessed or socket-like end portions 38 and 40.

The free ends 32 and 34 of the legs 26 and 28 constitute opposed jaws or grips having V-shaped recesses opening toward each other which are referred to by the reference numeral 42 and are defined by the end portions 32 and 34. In addition, the socket members 38 and 40 are crimped as at 44 and 46 respectively in order to form a pair of spaced axially aligned socket members. A coiled spring 48 which is designed and adapted to parallel the supporting shank 18 is in spaced parallelism in respect to the coacting part of the shank and spans the space between the socket members and has its ends seated in the socket portions and held against accidental displacement by way of the indentations 44 and 46 as seen with greater particularity in FIG. 3. Also from FIG. 3 of the drawings it will be noted that one end portion 50 of the spring 48 is stretched and that the remainder of the spring 48 has its convolutions 52 disposed in line-accommodating and gripping relation with each other in the manner shown.

The U-shaped member 24 (FIG. 4) is constructed of resilient material such as spring steel in order that the free ends of the legs 26 and 28 may be spread apart and clampingly engaged with the shank portion 18 of the reel 12. In this manner, the shank portion 18 is clampingly secured between the recesses 42 of the jaws or grips 32 and 34 and the line retainer 22 is thus mounted on the shank portion 18. When it is desired to secure the free end of the line 16 to the retainer, it is merely necessary to wedge the free end of the line between the convolutions 52 of the spring 48 which are disposed in surface-to-surface contacting relation with each other. In addition, as illustrated in FIGURE 1, the free end of the line 16 may be wound several times about the retainer 22 and the shank portion 18 in order that the spring 48 may be disposed in clamping engagement with various longitudinal spaced points on the line 16.

With attention now directed to FIGURES 5 through 8 of the drawings it will be seen a modified form of line retainer which is generally referred to by the reference numeral 22' and is substantially identical to the line retainer 22 with the exception that it is constructed of soft metal or other materials not known for their resiliency and is provided with a separate spring clip generally referred to by the reference numeral 54 for retaining the legs of the retainer 22' in clamping engagement with the shank 18. As the retainer 22' is substantially identical to the retainer 22, similar components of the retainer 22' have been given numbers corresponding to those given to those components of the retainer 22.

The spring clip generally referred to by the reference numeral 54 is generally C-shaped in cross-section including a pair of legs 56 and 58 which are interconnected by means of a semi-cylindrical bight portion 60. The bight portion 60 has a pair of notches 62 formed in its opposite end portions for the reception of the jaws 32' and 34' of the supporting legs 26' and 28'.

When it is desired to secure the retainer 22' on the shank portion 18, the spring clip 54 is first engaged with the legs 26' and 28'. Then, the shank portion 18 is engaged between the end portions 32' and 34' while the spring clip 54 is at the same time being moved toward the end portions 38' and 40'.

With attention now directed to FIGURES 9, 10 and 11 of the drawings it will be seen a still further modified form of the retainer which is referred to in general by the reference numeral 22". The retainer 22" includes a generally U-shaped member referred to in general by the reference numeral 24" that is provided with a pair of legs 26" and 28". The legs 26" and 28" each have a notch 31" formed therein defining two end portions 32" and 34" on each leg 26" and 28". In addition, each of the legs 26" and 28" includes a recess 66 and it will be noted that the recesses 66 open toward each other for embracingly engaging opposite sides of the shank portion 68 to which the U-shaped member 24" is secured. In addition, each of the legs 26" and 28" is apertured as at 70 and a fastener 72 is secured between the legs 26" and 28" comprising bracing means equivalent to the spring clip 54 which also comprises bracing means.

The bight portion 74 of the U-shaped member 24" is centrally apertured and a pair of resilient disks 76 and 78 disposed in side-by-side relation are secured thereto by means of a shank type fastener 80. Each of the disks has an outer peripheral portion 82 which is laterally offset relative to the central apertured portion thereof and the outer peripheral portions of the disk are disposed in surface-to-surface contacting relation. The fastener 80 secures the center portions of the disks 76 and 78 closer together than their normal positions relative to each other whereby the outer peripheral portions 82 thereof are resiliently urged into frictional engagement with each other. Between the outer peripheral portions 82 and the centrally apertured portions of the disks 76 and 78, each disk is provided with an annular recess 83 and the recesses 83 open toward each other. It will be noted from FIGURES 9 and 10 that the disk 76 includes a generally radially outwardly projecting hook portion 84 and it may be seen that this hook portion 84 is utilized to engage a portion of the fishing line 86 intermediate its opposite ends while the free end of the fishing line 86 is wound about the closely adjacent center portions of the disks 76 and 78. It will of course be noted that the free terminal end portion of the line 86 will be frictionally gripped between the confronting outer peripheral portions 82 of the disks and that the portion of the line 86 immediately adjacent the hooked portion 84 will also be similarly frictionally engaged by the line retainer 24".

With attention now directed to FIGURES 12 to 14 of the drawings there will be seen a still further modified form of line retainer generally referred to by the reference numeral 90. The line retainer 90 is incorporated into the manufacture of the shank portion 92 of the reel generally referred to by the reference numeral 94 and it will be noted that the shank portion 92 has a laterally opening notch 96 formed therein which defines two outstanding aligned lugs or shoulders 98 and 100. A recess is formed in each of the shoulders 98 and 100 to define and provide sockets and the opposite ends of a coiled spring 104 (FIG. 13) are seated and thus anchored in the sockets in the manner shown. As in the case with the fasteners or attachments 24 and 24' the spring 104 is stretched at one end as at 106 and has the convolutions 108 of the spring 104 at that one end of the spring spaced apart while the remaining convolutions 108 disposed between the shoulders 98 and 100 are disposed in surface-to-surface contacting relation with each other. It is believed readily apparent that the operation of the retainer 90 is substantially identical to the operation of the retainers 24 and 24'.

As previously set forth, while the various forms of line retainers disclosed herein have been illustrated being used in conjunction with a spinning reel, it is to be noted that the line retainers may also be used in conjunction with other types of reels.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A retainer for the free end portion of a fishing line when the line is not being used; said retainer comprising an adapter member generally U-shaped and including a bight portion interconnecting a pair of opposed legs, said bight portion embodying a pair of spaced axially aligned socket members, a coil spring spanning the space between said socket members and having its ends connected operatively with the socket portions thereof, a spring clip having portions thereof cooperable with said legs, the free end portions of said legs being provided with V-shaped jaws and said jaws being releasably engageable with the shank of a fishing reel.

2. The structure defined in claim 1 and wherein said clip comprises a member which is C-shaped in cross-section, the bight portion thereof being provided at ends with keeper notches constituting keeper seats and portions of said jaws contiguous to edge portions of the respectively cooperating legs being fitted releasably in their respective keeper seats.

3. In combination, a spinning reel shank designed and adapted to be mounted for use on a fishing rod, a fishing line retainer designed and adapted to provide a conveniently accessible place for temporarily attaching a free end portion of said fishing line when the latter is not being used, said line retainer embodying a pair of coplanar longitudinally spaced socket members carried by and lateral to the lengthwise axis of said shank, the opposed faces of said members providing cooperating sockets, and a coil spring parallel with an adjacent to said shank and having opposite end portions thereof seated telescopically and retained in the respectively cooperating sockets, said coil spring providing selectively usable convolutions which may be singly and collectively used for placement of the free end portion of said line therebetween to be frictionally gripped thereby.

4. In combination, a mounting shank designed and adapted to support a spinning reel and having means cooperable therewith for attachment to the shank of a fishing rod, a line retainer adjacent to and cooperable with said shank and providing a convenient place for attaching the otherwise free loose end of the fishing line thereto when the line is not being used, said line retainer comprising a one-piece generally U-shaped member embodying a bight portion and a pair of opposed legs joined to and cooperable with said bight portion, said U-shaped member being constructed of resilient material and said legs having free end portions provided with pairs of oppositely disposed V-shaped jaws designed and adapted and simultaneously and conformably gripping intervening portions of said shank and thus mounting said U-shaped member on and alongside the shank, said bight portion embodying a pair of duplicate axially aligned socket members, said socket members being possessed of inherent resiliency sufficient to resiliently urge said legs and also said jaws toward each other, the jaws yieldingly gripping said shank and detachably supporting the U-shaped member thereon, and a coil spring parallel with adjacent lengthwise edge portions of said legs and spanning the space between said socket members and having end portions thereof fitting telescopically and retentively into their respective socket members.

References Cited in the file of this patent

UNITED STATES PATENTS

| | | |
|---|---|---|
| 399,857 | Emmert | Mar. 19, 1889 |
| 2,597,836 | Klie | May 20, 1952 |
| 2,763,083 | Lenz | Sept. 18, 1956 |
| 2,825,992 | Miller | Mar. 11, 1958 |
| 2,846,804 | Elliott | Aug. 12, 1958 |
| 3,051,404 | Ritchey | Aug. 28, 1962 |